(12) United States Patent
McColloch et al.

(10) Patent No.: US 8,911,158 B2
(45) Date of Patent: Dec. 16, 2014

(54) Z-PLUGGABLE OPTICAL COMMUNICATIONS MODULE, AN OPTICAL COMMUNICATIONS SYSTEM, AND A METHOD

(75) Inventors: Laurence R. McColloch, Santa Clara, CA (US); Seng-Kum Chan, Santa Clara, CA (US); David J. K. Meadowcroft, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 85 days.

(21) Appl. No.: 13/543,930

(22) Filed: Jul. 9, 2012

(65) Prior Publication Data
US 2014/0010552 A1    Jan. 9, 2014

(51) Int. Cl.
*G02B 6/36* (2006.01)

(52) U.S. Cl.
USPC .......................................................... 385/89

(58) Field of Classification Search
None
See application file for complete search history.

(56) References Cited

U.S. PATENT DOCUMENTS

| | | | |
|---|---|---|---|
| 5,046,955 A * | 9/1991 | Olsson | 439/74 |
| 5,615,292 A * | 3/1997 | Beckwith | 385/89 |
| 5,953,118 A | 9/1999 | O'Rourke et al. | |
| 6,074,228 A * | 6/2000 | Berg et al. | 439/180 |
| 6,201,704 B1 * | 3/2001 | Poplawski et al. | 361/753 |
| 6,485,322 B1 | 11/2002 | Branch et al. | |
| 6,846,115 B1 * | 1/2005 | Shang et al. | 385/92 |
| 8,863,453 B2 | 3/2005 | Wang et al. | |
| 6,893,293 B2 | 5/2005 | Ice et al. | |
| 6,922,496 B2 | 7/2005 | Morris | |
| 6,935,882 B2 | 8/2005 | Hanley et al. | |
| 7,150,653 B1 | 12/2006 | Mason | |
| 7,195,403 B2 | 3/2007 | Oki et al. | |
| 7,213,979 B2 | 5/2007 | Park | |
| 7,234,880 B1 | 6/2007 | Charny et al. | |
| 7,255,495 B2 * | 8/2007 | Yi et al. | 385/92 |
| 7,303,336 B2 * | 12/2007 | Kayner et al. | 385/55 |
| 7,374,347 B1 | 5/2008 | Oki et al. | |
| 8,770,864 B2 | 7/2014 | Ito | |
| 2004/0203289 A1 | 10/2004 | Ice et al. | |
| 2005/0025434 A1 | 2/2005 | Benner et al. | |
| 2005/0286837 A1 | 12/2005 | Oki et al. | |
| 2007/0140621 A1 | 6/2007 | DeCusatis et al. | |
| 2009/0129725 A1 | 5/2009 | Durrant et al. | |
| 2009/0149037 A1 | 6/2009 | Lee et al. | |
| 2011/0268390 A1 | 11/2011 | Yi et al. | |

OTHER PUBLICATIONS

Hagge, J.K., "State-of-the-Art Multichip Modules for Avionics", *IEEE Transactions on Components, Hybrids, and Manufacturing Technology*, Cedar Rapids, Iowa Feb. 1992, 29-42.

(Continued)

*Primary Examiner* — Sung Pak

(57) ABSTRACT

A Z-pluggable optical communications module (OCM) is provided that contains multiple parallel OCMs (POCMs) and that is configured to be removably plugged into an opening formed in a front panel of an optical communications system. When the Z-pluggable OCM is plugged in a forward Z-direction into the opening formed in the front panel, an actuator mechanism is actuated to impart motion to the Z-pluggable OCM in the downward Y-direction to cause the Z-pluggable OCM to be mounted on an upper surface of a motherboard PCB. In order to unplug the Z-pluggable OCM, the actuator mechanism is actuated to impart motion to the Z-pluggable OCM in the upward Y-direction to cause it to be dismounted from the motherboard PCB.

20 Claims, 15 Drawing Sheets

(56) References Cited

OTHER PUBLICATIONS

Israelsohn, Joshua, "10-Gbps Fiber-Optic Transponders", *EDN Magazine*, www.edn.com, San Francisco, United States Feb. 6, 2003, 57-69.

Schaefer, George, "VI Systems Launches Tosa/Rosa Modules for the Next Generation Fibre Channel FC32G", *Press Release*, Berlin, Germany May 30, 2012.

Sugimoto, T. et al., "12-Channel x20-Gbps On-board Parallel Optical Modules Using Multi-Chip Visual Alignment Technique", *Electronic Components and Technology Conference (ECTC)*, Kawasaki, Kanagawa, Japan Jun. 1-4, 2010, 256-262.

Yashiki, K et al., "High Throughput On-board Parellel Optical Modules Using Multi-Chip Visual Alignment Technique", *CPMT Symposium Japan*; Kawasaki, Japan Aug. 24-26, 2010, 1-4.

Sven Rzepka, Kaustav Banerjee, Ekkehard Meusel and Chenming Hu, Characterization of Self-Heating in Advanced VLSI Interconnect Lines Based on Thermal Finite Element Simulation, Journal, Sep. 3, 1998, p. 406-411, vol. 21, No. 3, IEEE.

\* cited by examiner

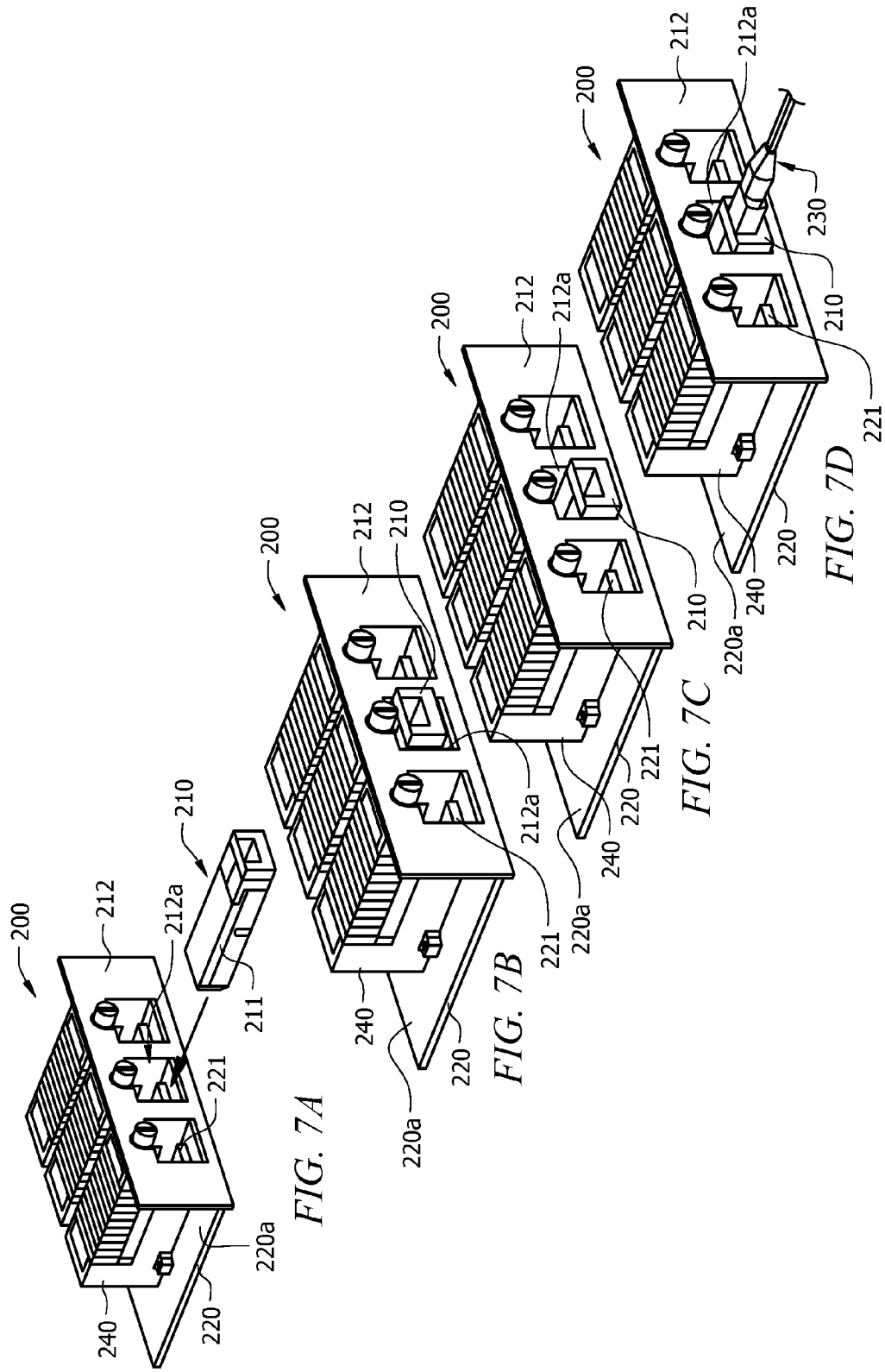

Z-PLUGGABLE OPTICAL COMMUNICATIONS MODULE, AN OPTICAL COMMUNICATIONS SYSTEM, AND A METHOD

TECHNICAL FIELD OF THE INVENTION

The invention relates to optical communications systems. More particularly, the invention relates to an optical communications module that is Z-pluggable such that it can be removably edge mounted in a front panel of an optical communications system.

BACKGROUND OF THE INVENTION

A parallel optical communications module is a module having multiple transmit (TX) channels, multiple receive (RX) channels, or both. A parallel optical transceiver module is an optical communications module that has multiple TX channels and multiple RX channels in TX and RX portions, respectively, of the transceiver module. The TX portion comprises components for transmitting data in the form of modulated optical signals over multiple optical waveguides, which are typically optical fibers. The TX portion includes a laser driver circuit and a plurality of laser diodes. The laser driver circuit outputs electrical signals to the laser diodes to modulate them. When the laser diodes are modulated, they output optical signals that have power levels corresponding to logic 1s and logic 0s. An optics system of the transceiver module focuses the optical signals produced by the laser diodes into the ends of respective transmit optical fibers held within a connector that mates with the transceiver module.

Typically, the TX portion also includes a plurality of monitor photodiodes that monitor the output power levels of the respective laser diodes and produce respective electrical feedback signals that are fed back to the transceiver controller. The transceiver controller processes the feedback signal to obtain respective average output power levels for the respective laser diodes. The transceiver controller outputs control signals to the laser driver circuit that cause it to adjust the modulation and/or bias current signals output to the respective laser diodes such that the average output power levels of the laser diodes are maintained at relatively constant levels.

The RX portion includes a plurality of receive photodiodes that receive incoming optical signals output from the ends of respective receive optical fibers held in the connector. The optics system of the transceiver module focuses the light that is output from the ends of the receive optical fibers onto the respective receive photodiodes. The receive photodiodes convert the incoming optical signals into electrical analog signals. An electrical detection circuit, such as a transimpedance amplifier (TIA), receives the electrical signals produced by the receive photodiodes and outputs corresponding amplified electrical signals, which are processed in the RX portion to recover the data.

There is an ever-increasing demand in the optical communications industry for parallel optical communications systems that are capable of simultaneously transmitting and receiving ever-increasing amounts of data. To accomplish this, it is known to combine multiple parallel optical transceiver modules of the type described above to produce a parallel optical communications system that has a higher bandwidth than the individual parallel optical transceiver modules. A variety of parallel optical transceiver modules are used in such systems for this purpose.

FIG. 1 illustrates a perspective view of an electrical connector 2, known in the industry as a Meg-Array connector, mounted on a printed circuit board (PCB) 3. The Meg-array connector 2 comprises a socket 4 having an array of electrically-conductive ball contacts (not shown) on its bottom surface and an array of electrically conductive bladed pairs 5 on its upper surface. FIG. 2 illustrates a perspective view of the Meg-array connector 2 shown in FIG. 1 after a parallel optical transceiver module 6, known in the industry as a Snap-12 parallel optical transceiver module, has been plugged into the socket 4. The snap-12 module 6 has an array of electrical contacts (not shown) on its lower surface that come into contact with respective electrically-conductive bladed pairs 5 of the Meg-Array connector 2 when the module 6 is pressed down in the Y-direction of an X, Y, Z Cartesian coordinate system into the socket 4.

A receptacle 7 is disposed within an opening formed in a front panel 8 of a box (not shown) for receiving an optical connector module (not shown). The optical connector module (not shown) is mated with the receptacle 7 by inserting the optical connector module in the Z-direction through the opening formed in the front panel 8 into the receptacle 7 such that mating features (not shown) on the inside of the receptacle 7 engage respective mating features (not shown) on the optical connector module (not shown). This type of mounting arrangement is known in the industry as an edge-mounted arrangement due to the fact that the front panel 8 constitutes an edge of the box in which the parallel optical transceiver modules are mounted. The optical connector module is mechanically and optically coupled to an end of an optical fiber ribbon cable (not shown) having a plurality (e.g., 4, 8, 12, 24, or 48) of optical fibers.

By mounting multiple of the optical transceiver modules 6 side-by-side on the motherboard PCB 3, an optical communications system with very high bandwidth can be achieved. There are, however, disadvantages associated with edge-mounted arrangements of the type shown in FIG. 2. One such disadvantage is that the receptacles 7 and the respective optical connector modules (not shown) are relatively wide in the X-dimension and therefore consume large amounts of space on the front panel 8. Because space on the front panel 8 is limited, the ability to increase bandwidth by increasing the size of the array is also limited.

Another disadvantage associated with the edge-mounted arrangement shown in FIG. 2 is that the parallel optical transceiver modules 6 are not Z-pluggable, i.e., they cannot be plugged into and unplugged from the front panel 8. Rather, before the top of the box has been secured in position, the modules 6 are plugged into their respective Meg-Array sockets 4 by placing the modules 6 over the respective sockets 4 and applying a force in the downward Y-direction. The top of the box is then secured in position. This makes the tasks of installing the modules 6 and swapping the modules 6 out relatively difficult and time-consuming.

SUMMARY OF THE INVENTION

The invention is directed to a Z-pluggable optical communications module (OCM), an optical communications system and a method. The Z-pluggable OCM comprises a generally rectangular OCM housing, a first PCB disposed within the housing, a plurality of parallel OCMs (POCMs) mounted on the first PCB, first ends of optical fibers of a plurality of groups of optical fibers of at least one optical fiber cable, and a strain relief device coupled to the optical fiber cable and to a first end of the housing. Each POCM has a plurality of channels, with each channels being either a transmit channel for transmitting optical data signals or a receive channel for receiving optical data signals. The OCM housing is configured to be inserted through an opening formed in a front panel of an optical communications system box in a Z-direction of an X, Y, Z Cartesian Coordinate system, where the Z-direction is orthogonal to an X-Y plane in which the front panel resides.

The optical communications system comprises a system housing, a motherboard PCB, a plurality of arrays of electrically-conductive contacts disposed on an upper surface of the motherboard PCB, a plurality of guide systems disposed within the system housing in alignment with respective ones of the openings formed in the front panel, a plurality of actuator mechanisms disposed within the box and mechanically coupled to respective ones of the guide systems. The system housing has at least a bottom panel and a front panel. The front panel has a plurality of openings formed in it and resides in an X-Y plane of an X, Y, Z Cartesian Coordinate system. The motherboard PCB is mounted on an upper surface of the bottom panel. The guide systems are configured to guide respective Z-pluggable OCMs in forward and reverse Z-directions relative to the X, Y, Z Cartesian coordinate system within an interior space of the system housing. The Z-directions are normal to the X-Y plane in which the front panel resides. Each actuator mechanism is configured to be actuated to impart motion to a respective one of the Z-pluggable OCMs in a downward Y-direction and to be actuated to impart motion to a respective one of the Z-pluggable OCMs in an upward Y-direction.

The method comprises: providing a system housing having at least a bottom panel and a front panel, providing at least one Z-pluggable OCM, fully inserting the Z-pluggable OCM within one of a plurality of openings formed in a front panel of the system housing such that an OCM housing of the Z-pluggable OCM fully engages a guide system disposed within the housing, and actuating an actuator mechanism disposed within the system housing to cause a force to be exerted on the Z-pluggable OCM in the downward Y-direction until a plurality of arrays of electrically-conductive contacts disposed on a lower surface of a PCB of the Z-pluggable OCM engage respective ones of a plurality of arrays of electrically-conductive contacts disposed on an upper surface of a motherboard PCB disposed on an upper surface of a bottom panel of the system housing.

These and other features and advantages of the invention will become apparent from the following description, drawings and claims.

BRIEF DESCRIPTION OF THE DRAWINGS

FIGS. 7A-7D illustrate another embodiment of an optical communications system that is configured to receive a Z-pluggable OCM and that includes an actuator mechanism for imparting motion in the downward and upward Y-directions to the Z pluggable OCM.

DETAILED DESCRIPTION OF AN ILLUSTRATIVE EMBODIMENT

In accordance with the invention, a Z-pluggable optical communications module (OCM) is provided that contains multiple parallel OCMs (POCMs) and that is configured to be removably plugged into an opening formed in a front panel of an optical communications system. When the Z-pluggable OCM is plugged in a forward Z-direction into the opening formed in the front panel, an actuator mechanism imparts motion to the Z-pluggable OCM in the downward Y-direction to cause the Z-pluggable OCM to be mounted on an upper surface of a motherboard PCB. In order to unplug the Z-pluggable OCM, the actuator mechanism imparts motion to the Z-pluggable OCM in the upward Y-direction to cause it to be dismounted from the motherboard PCB. Once dismounted from the motherboard PCB, a user may remove the Z-pluggable OCM from the system by exerting a force on the Z-pluggable OCM in the reverse Z-direction, i.e., in a direction normal to, and away from, the front panel.

The Z-pluggable OCM is relatively long in the Z-dimension to accommodate the plurality of parallel OCMs that are contained therein, which are cascaded in the Z-direction inside of the Z-pluggable OCM. However, the Z-pluggable OCMs are relatively narrow in the X-dimension. By making the Z-pluggable OCMs relatively long in the Z-dimension, a relatively large number of POCMs can be cascaded in the Z-direction inside of the module, which allows the X-dimension of the system to be kept relatively small. By keeping the module relatively narrow in the X-dimension, a larger number of the Z-pluggable OCMs can be installed in the front panel to increase edge-mounting density. The increase in the number of POCMs that can be cascaded in the Z-direction within each Z-pluggable OCM combined with the increased edge-mounting density allows a very high overall bandwidth to be achieved. In addition, the Z-pluggability of the module allows it to be easily installed and removed to provide many other advantages, such as, for example, the ability to easily replace one of the modules in the event of a part failure.

Figure 3:
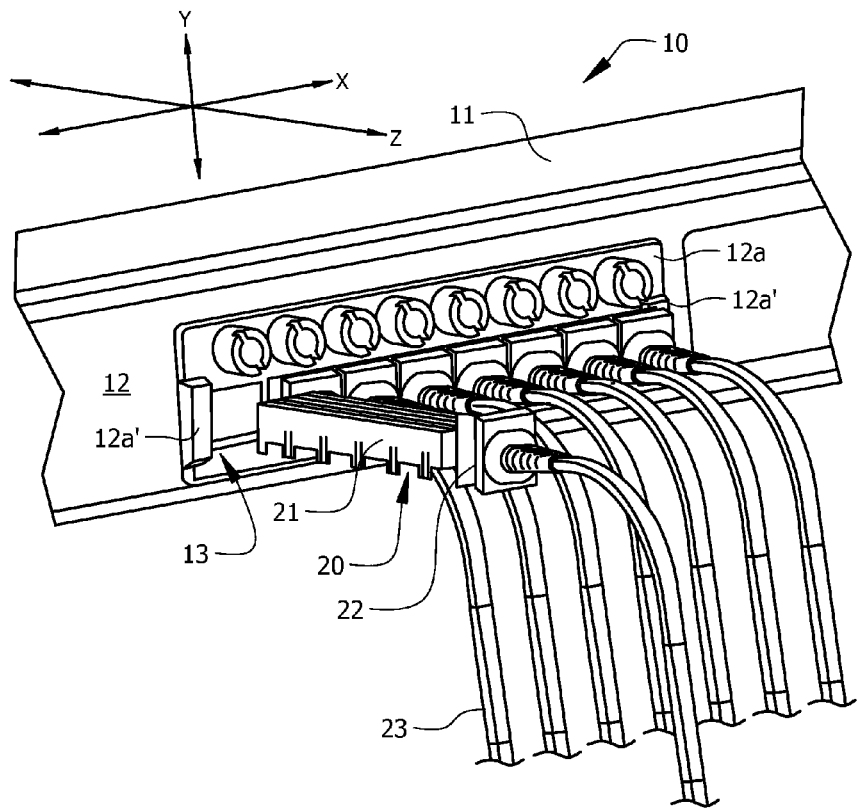
FIG. 3 illustrates a front perspective view of an optical communications system in accordance with an illustrative embodiment.

FIG. 3 illustrates a front perspective view of an optical communications system 10 in accordance with an illustrative embodiment. A box, or housing, 11 of the optical communications system 10 has a front panel 12 with openings 13 formed in it for receiving respective Z-pluggable OCMs 20. As will be described in more detail below, each of the Z-pluggable OCMs 20 has a metal housing 21 and a plurality of POCMs (not shown), which are mounted within the housing 21. Each of the Z-pluggable OCMs 20 has an electromagnetic interference (EMI) shielding device 22 attached to one end thereof, which is attached to and end of an optical fiber ribbon cable 23 and to an end of the metal housing 21. As will be described below in more detail, the EMI shielding device 22 performs EMI shielding functions.

Figure 4:
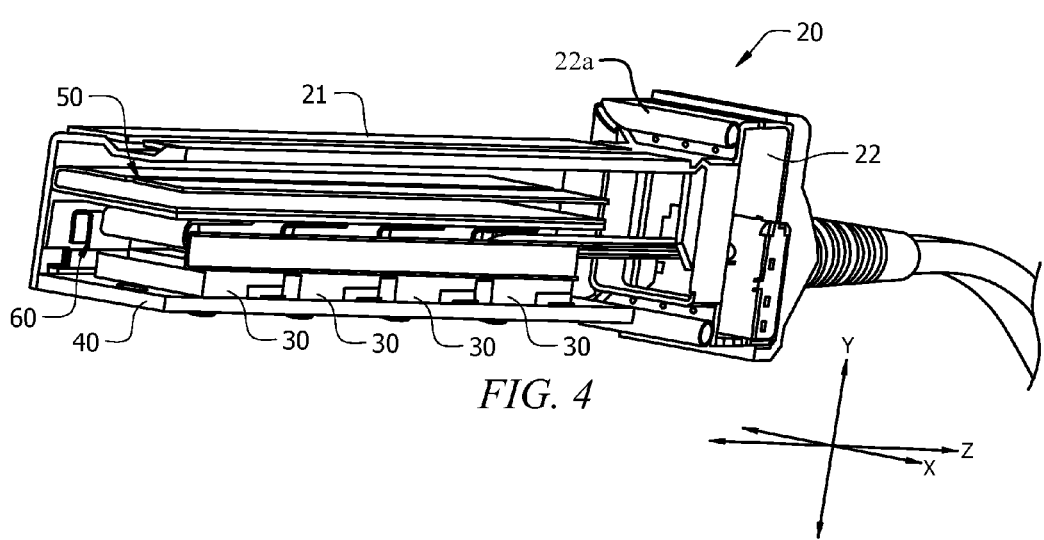
FIG. 4 illustrates a perspective view of one of the Z-pluggable OCMs shown in FIG. 3 with one side of the housing removed to reveal the parallel OCMs and a PCB on which the parallel OCMs are mounted.

FIG. 4 illustrates a perspective view of one of the Z-pluggable OCMs 20 shown in FIG. 3 with one side of the housing 21 removed to reveal POCMs 30 and a PCB 40 on which the POCMs 30 are mounted. In accordance with this illustrative embodiment, four POCMs 30, each having six transmit channels and six receive channels, are mounted on the PCB 40 and electrically interconnected with the PCB 40. Thus, in accordance with this embodiment, each ribbon cable 23 has twenty-four transmit fibers and twenty-four receive fibers. The invention, however, is not limited with respect to the number of POCMs 30 that are contained in each Z-pluggable OCM 20, or with respect to the number of transmit and/or receive channels that are provided in each POCM 30. The invention also is not limited with respect to the number of optical fibers that are contained in the ribbon cables 23.

Figure 1:
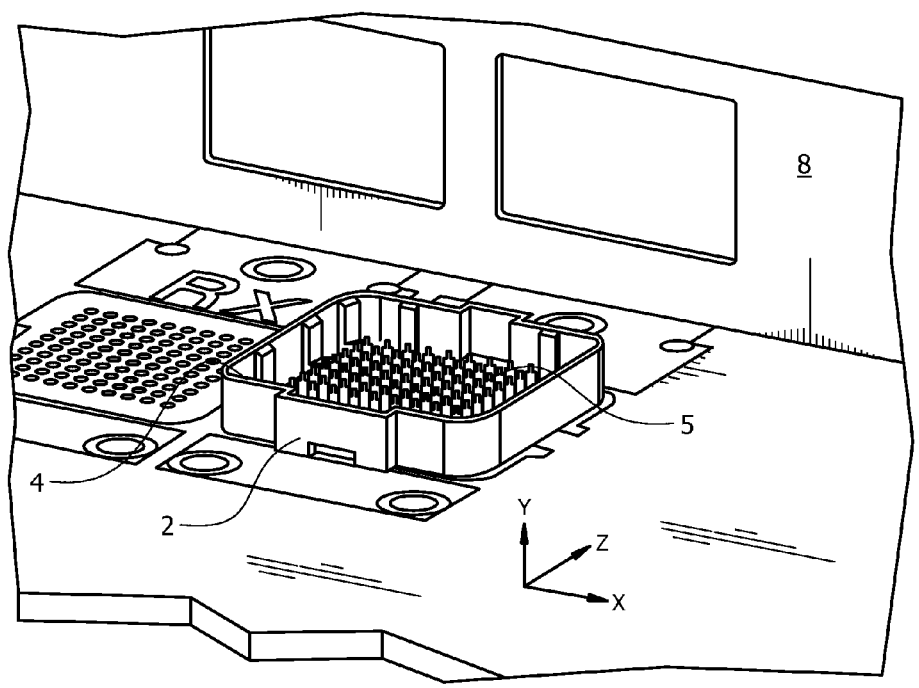
FIG. 1 illustrates a perspective view of a Meg-Array connector mounted on a PCB.
Figure 2:
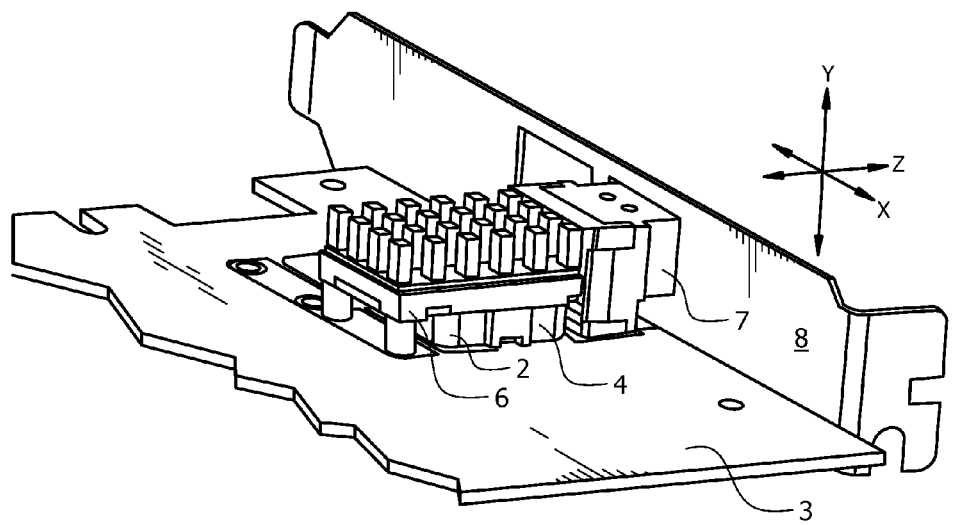
FIG. 2 illustrates a perspective view of the Meg-Array connector shown in FIG. 1 after a Snap-12 parallel optical transceiver module has been plugged into the socket of the Meg-Array connector.

With reference again to FIG. 3, although the Z-pluggable OCM 20 is not limited to having any particular X, Y or Z dimensions, in accordance with an illustrative embodiment, each Z-pluggable OCM 20 has a width in the X-dimension of approximately 0.5 inches, which is about half the width of the parallel optical communications module 6 shown in FIGS. 1 and 2. Even with this greatly reduced width, each Z-pluggable OCM 30 provides about twice as many channels as the parallel optical communications module 6. Thus, the edge-mounting configuration shown in FIG. 3 has a front panel mounting density that is about four times greater than that of the configuration shown in FIG. 2.

With reference again to FIG. 4, because of the high mounting density of the Z-pluggable OCMs 20 in the front panel 12, and because of the large number of channels that each Z-pluggable OCM 20 has, a relatively large amount of heat will need to be dissipated in the system 10. For this reason, the Z-pluggable OCM 20 of the embodiment shown in FIG. 4 has been designed with separate heat sink structures for the ICs (not shown) and for the laser diodes (not shown). This feature allows the ICs and the laser diodes to operate at different temperatures. One of the heat sink structures 50 is thermally coupled by the metal housing 21 to a thermal pad (not shown) on which the ICs are mounted, while the other of the heat sink structures 60 is thermally coupled to a metal lead frame (not shown) on which the laser diodes are mounted. The heat sink structures 50 and 60 spread and dissipate heat generated by the ICs and by the laser diodes, respectively.

In addition to the heat spreading and dissipation functions that are performed by the separate heat sink structures 50 and 60, the system 10 preferably will include a cooling system (not shown) that will blow air through the metal housings 21 of the Z-pluggable OCMs 20 to facilitate cooling. Air that is blown through the heat sink structure 50 in the Z-direction will cool the ICs of the POCMs 30 whereas air that is blown through the heat sink structure 60 will cool the laser diodes of the POCMs 30.

With reference to FIG. 4, the PCB 40 of the Z-pluggable OCM 20 has arrays of electrically-conductive contacts (not shown) disposed on its lower surface that are electrically connected to the respective parallel OCMs 30. These arrays of electrically-conductive contacts come into contact with respective arrays of electrically-conductive contacts disposed on the upper surface of the motherboard PCB (not shown) of the system 10 (FIG. 3) when the Z-pluggable OCM 20 is edge-mounted in the front panel 12 (FIG. 3), as will be described below in more detail with reference to FIGS. 5-6D.

The invention is not limited with respect to the type or configuration of the POCMs that are used in the Z-pluggable OCMs 20, or with respect to the manner in which the POCMs are mounted within the housing 21. Other examples of POCMs that are suitable for this purpose are disclosed in U.S. Pat. Nos. 7,331,720, and 8,036,500, which are assigned to the assignee of the present application and which are incorporated by reference herein in their entireties. A variety of other known POCMs are also suitable for use with the invention, as will be understood by persons skilled in the art in view of the description being provided herein.

Figure 5:
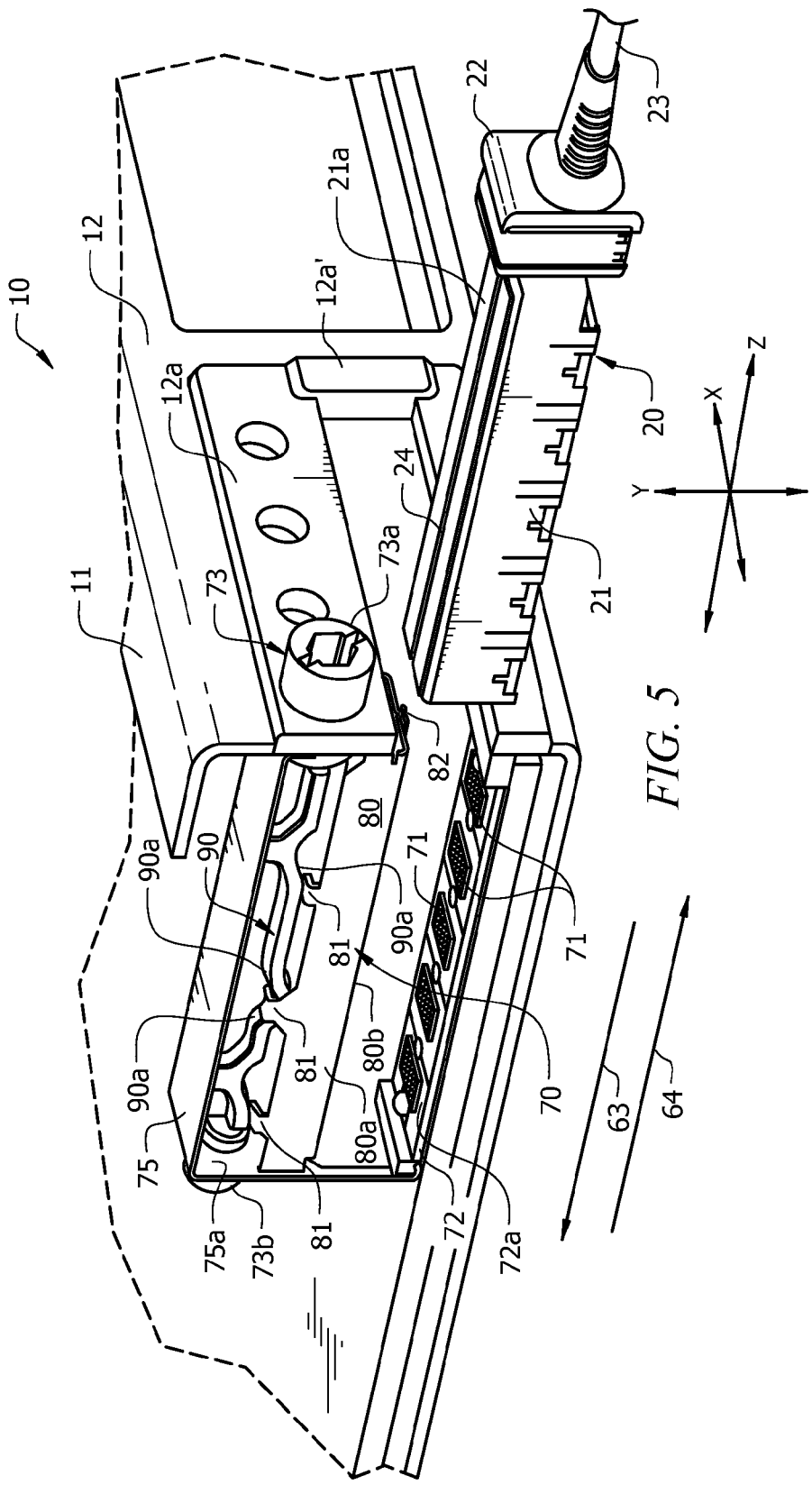
FIG. 5 illustrates a front perspective view of the optical communications system shown in FIG. 3 with a portion of the box and front panel removed to reveal an actuator mechanism for imparting motion to the Z-pluggable OCM in the downward and upward Y-directions.

FIG. 5 illustrates a front perspective view of the optical communications system 10 shown in FIG. 3 with a portion of the metal system box, or housing, 11 and metal front panel 12 removed to reveal an actuator mechanism 70 disposed inside of the system box 11. The purpose of the actuator mechanism 70 is to impart motion to the Z-pluggable OCM 20 in the downward and upward Y-directions to engage and disengage, respectively, the OCM 20 from arrays 71 of electrically-conductive contacts disposed on an upper surface 72a of a motherboard PCB 72. In accordance with this embodiment, the actuator mechanism 70 is a screw-turn actuator that actuates a cam mechanism that lowers the Z-pluggable OCM 20 onto the upper surface 72a of the motherboard PCB 72 when an Acme screw 73 is turned in one direction and that lifts the Z-pluggable OCM 20 off of the upper surface 72a of the motherboard PCB 72 when the Acme screw 73 is turned in the opposite direction.

The actuator mechanism 70 includes a guide system 80 that is an elongated, generally rectangular structure having a cam follower 81 integrally formed therein along upper edges of opposite sides of the guide system 80. Only one side 80a of the guide system 80 is visible in FIG. 5, but the opposite side is structurally identical to side 80a. The guide system 80 has a hanger 82 integrally formed therein along the length of its lower surface 80b. The housing 21 of the Z-pluggable OCM 20 has a track 24 formed along the length of its upper surface 21a. The track 24 and the hanger 82 are sized and shaped to engage one another when the Z-pluggable OCM 20 is inserted through the front panel 12 in the Z-direction with the track 24 and the hanger 82 aligned with one another. The guide system 80 guides the Z-pluggable OCM 20 in forward Z-directions and reverse Z-directions into and out of the box 11, respectively. Once the Z-pluggable OCM 20 has been fully inserted into the box 11, it is ready to be lowered down in the Y-direction onto the upper surface 72a of the motherboard PCB 72 by the actuator mechanism 70.

The Acme screw 73 of the actuator mechanism 70 includes a head 73a and a threaded shaft (not shown), with the head 73a being fixed to one end of the threaded shaft and in abutment with a metal bezel 12a that is secured to the front panel 12. An Acme threaded nut 73b is threadingly engaged with the opposite end of the shaft and is rotationally coupled to a back vertical wall 75a of a bay housing 75. A cam 90 is fixedly secured to the shaft of the Acme screw 73 along its length. For this reason, the shaft is not visible in FIG. 5. The cam 90 has a cam surface 90a formed in it that limits the direction of travel of the cam follower 81. When the Acme screw 73 is turned in the clockwise direction, the cam 90 moves in the forward Z-direction indicated by arrow 63. When the cam 90 moves in this direction, the direction of travel of the cam follower 81 causes the guide system 70 to be lowered, i.e., to move in the downward Y-direction. When the Acme screw 73 is turned in the counter clockwise direction, the cam 90 moves in the reverse Z-direction indicated by arrow 64. When the cam 90 moves in this direction, the direction of travel of the cam follower 81 causes the guide system 70 to be lifted, i.e., to move in the upward Y-direction.

After the Z-pluggable OCM 20 has been fully inserted through the front panel 12 such that the EMI shielding device 22 is in abutment with the bezel 12a, the person installing the OCM 20 turns the head 73a of the Acme screw 73 by two turns in the counter clockwise direction to cause the OCM 20 to be lowered (i.e., moved in the downward Y-direction) onto the upper surface 72a of the motherboard PCB 72. When the OCM 20 has been fully lowered onto the upper surface 72a of the motherboard PCB 72, the arrays of electrically-conductive contacts that are disposed on the lower surface of the PCB 40 (FIG. 4) of the OCM 20 come into contact with the respective arrays 71 of electrically-conductive contacts disposed on the upper surface 72a of the motherboard PCB 72. To remove the OCM 20 from the system 10, the person removing the OCM 20 turns the head 73a of the Acme screw 73 by two turns in the clockwise direction to cause the OCM 20 to be lifted (i.e., moved in the upward Y-direction) off of the motherboard PCB 72. The person can then remove the OCM 20 from the system 10 by sliding the OCM 20 in the reverse Z-direction away from, and generally perpendicular to, the front panel 12. Of course, two turns is not the only thread pitch that may be used for this purpose, so this is merely an example of the manner in which the screw-turn actuator mechanism 70 may operate.

FIGS. 6A-6E illustrate perspective views of an optical communications system 100 that employs a spring-loaded actuator mechanism 110 to impart motion in the upward and downward Y-directions to a Z-pluggable OCM 120. The optical communications system 100 includes a metal system box, or housing, 101 having a front panel 102. The sides of the box 101 have been removed in FIGS. 6A-6E to make it easier to see the spring-loaded actuator mechanism 110. A motherboard PCB 103 is mounted on an upper surface of a bottom panel 104 of the box 101. A plurality of Meg-array sockets 105 that are similar or identical to the socket 4 shown in FIGS. 1 and 2 are mounted on the upper surface 103a of the motherboard PCB 103. The number of Meg-array sockets 105 that are mounted on the motherboard PCB 103 in the Z-direction is equal to the number of POCMs 106 that are included in each of the Z-pluggable OCMs 120.

Figure 6A:
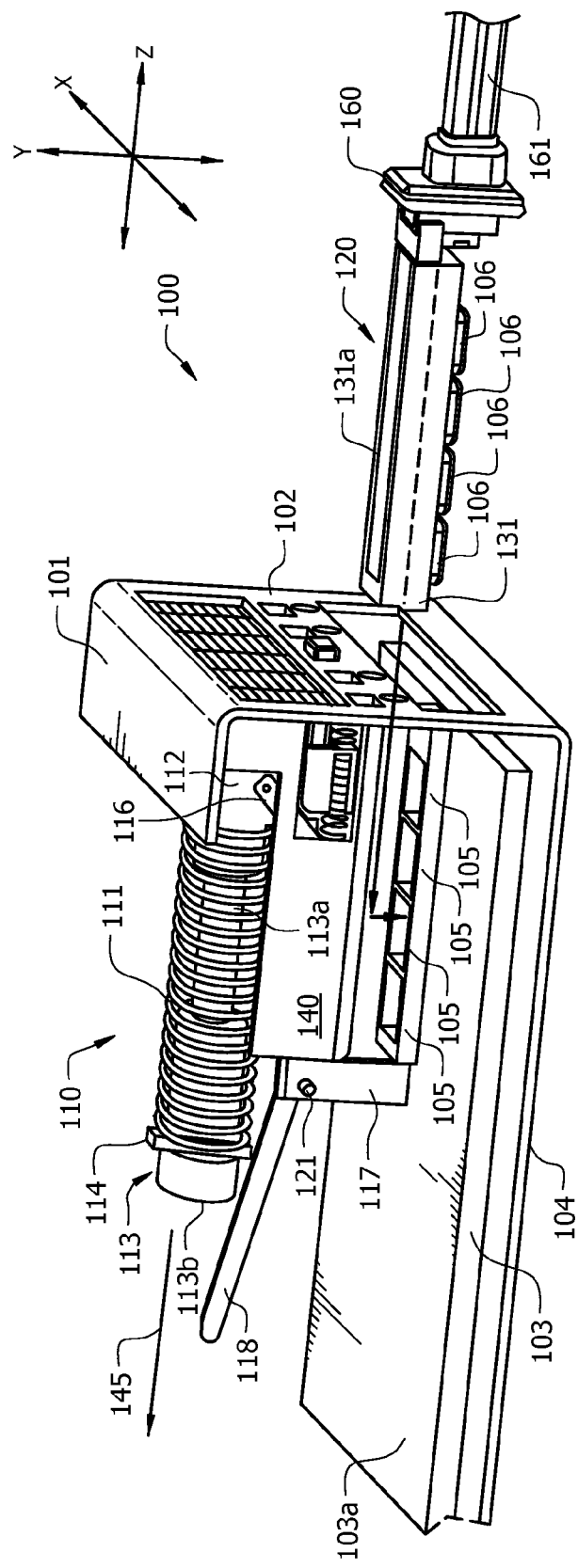
FIGS. 6A-6E illustrate perspective views of an optical communications system that employs a spring-loaded actuator mechanism to impart motion in the upward and downward Y-directions to a Z-pluggable OCM.
Figure 6B:
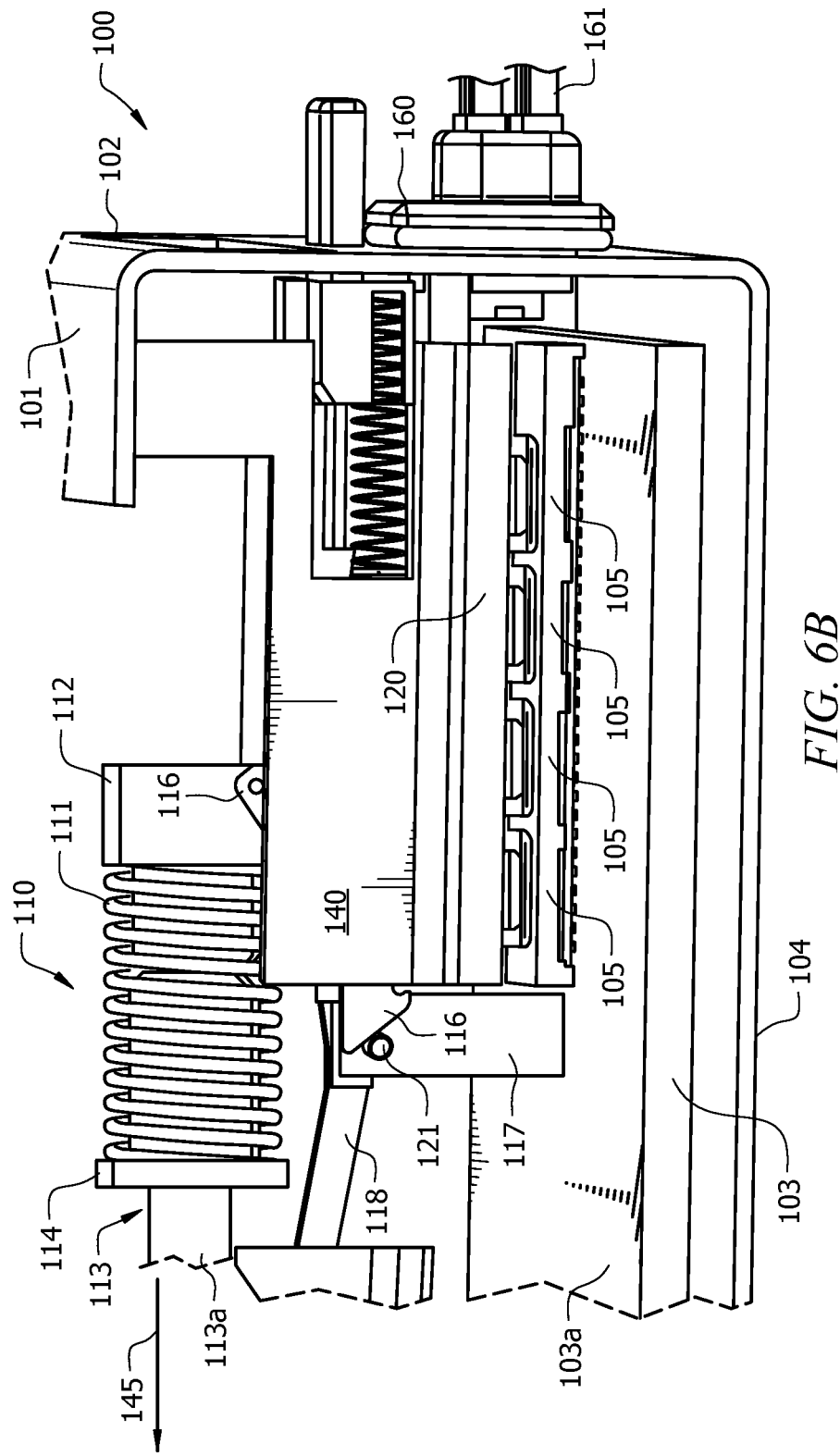
Figure 6C:
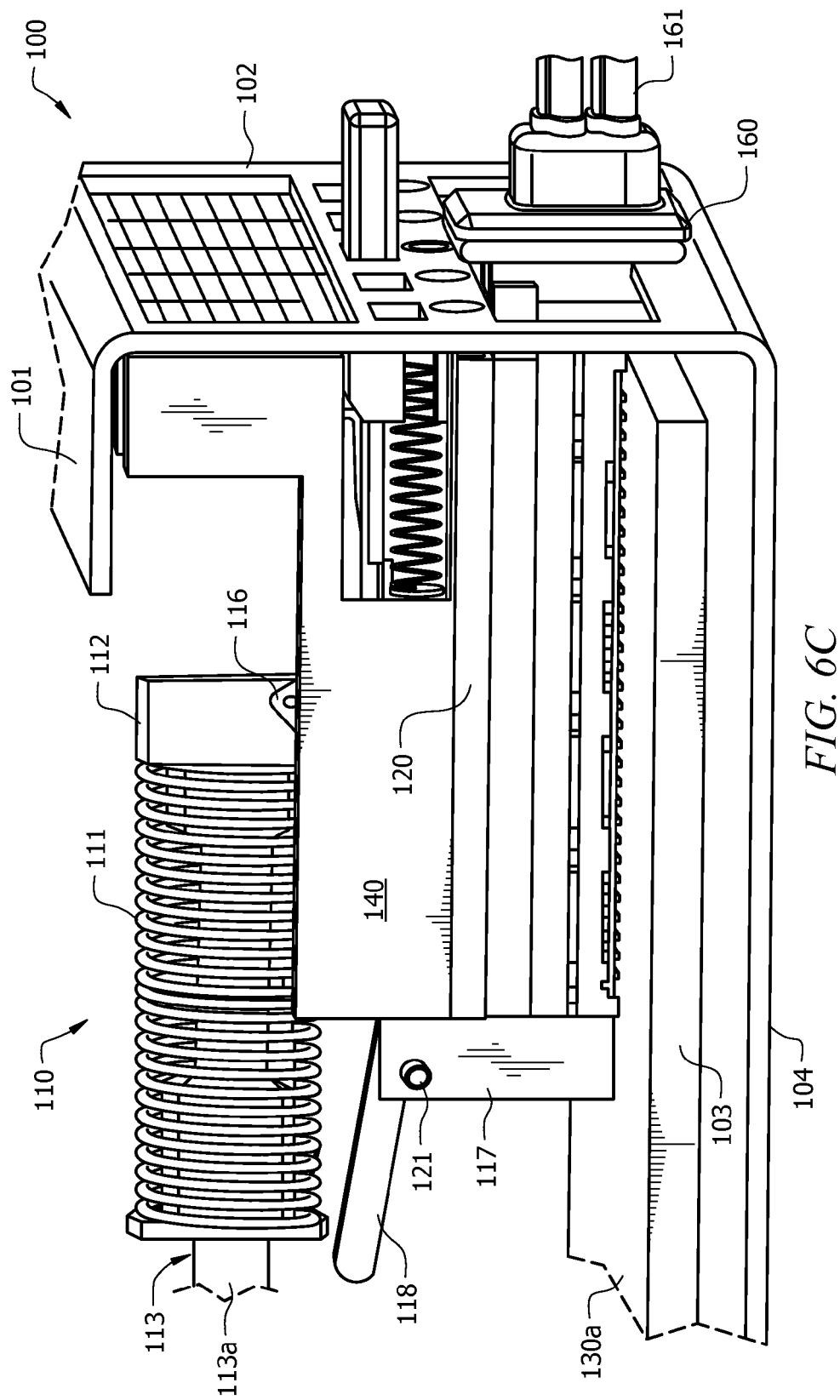
Figure 6D:
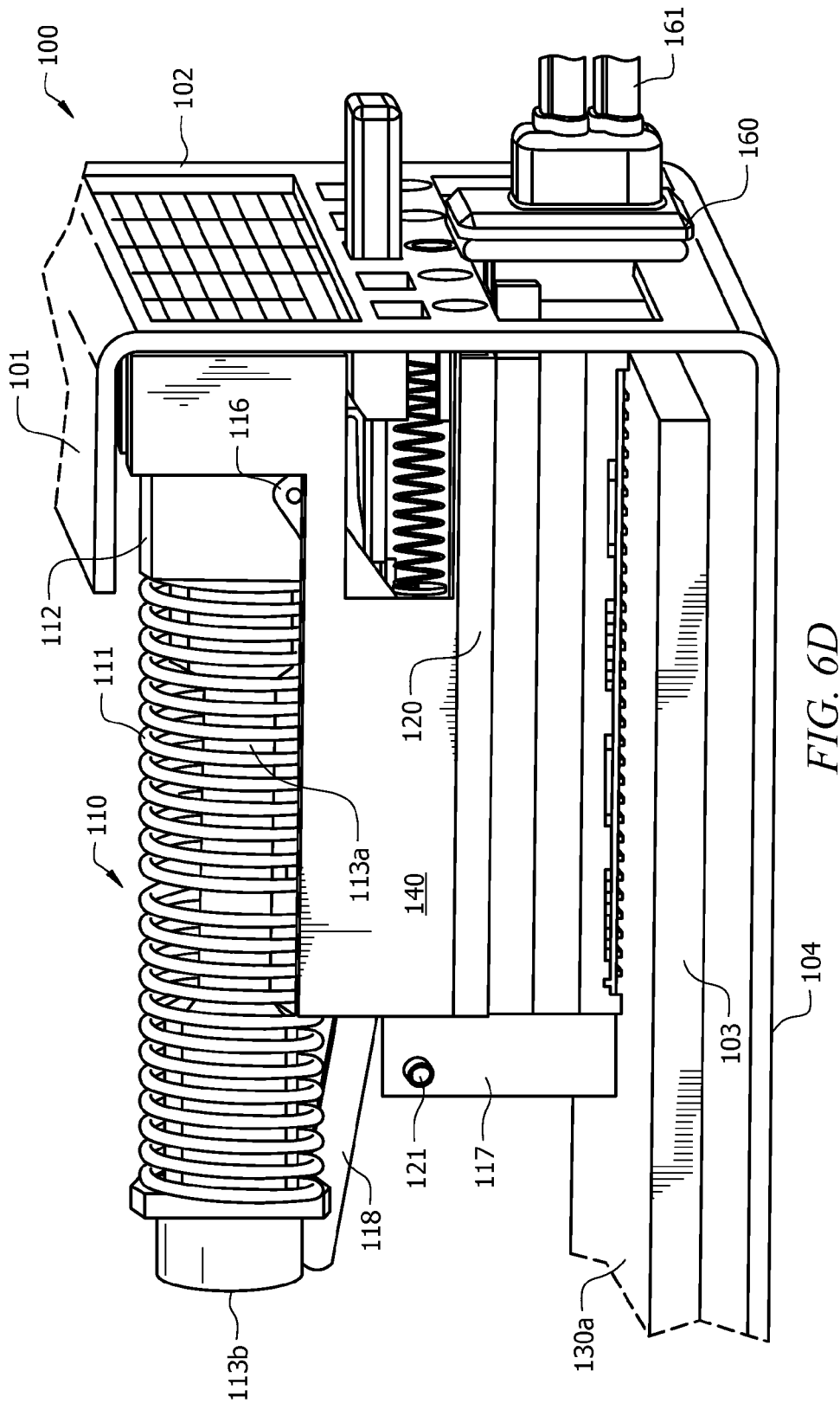
Figure 6E:
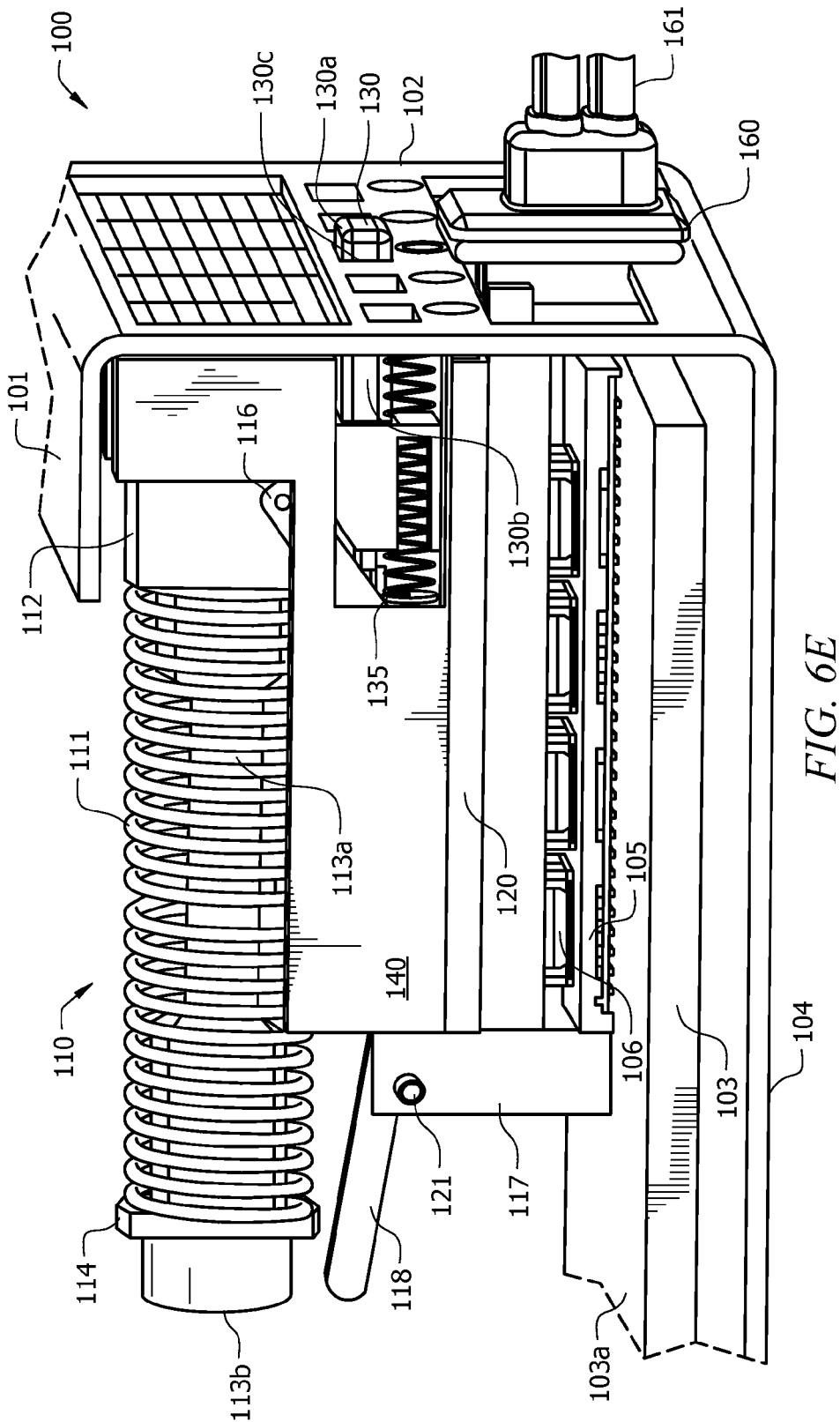

FIG. 6A illustrates the optical communications system 100 and one of the Z-pluggable OCMs 120 prior to the OCM 120 being inserted in the forward Z-direction through an opening formed in the front panel 102. FIG. 6B illustrates the optical communications system 100 and one of the Z-pluggable OCMs 120 after the OCM 120 has been fully inserted into the system 100, but just prior to the spring-loaded actuator mechanism 110 being triggered. FIG. 6C illustrates the optical communications system 100 and one of the Z-pluggable OCMs 120 just after the spring-loaded actuator mechanism 110 has been triggered, but prior to all of the energy that is stored in a main compression spring 111 of the actuator mechanism 110 being released. FIG. 6D illustrates the optical communications system 100 and one of the Z-pluggable OCMs 120 after the spring-loaded actuator mechanism 110 has been triggered and all of the energy that was stored in the main spring 111 has been released to cause a cam (not shown) to force the Z-pluggable OCM 120 in the downward Y-direction onto the upper surface 103a of the motherboard PCB 103. FIG. 6E illustrates the optical communications system 100 with one of the Z-pluggable OCMs 120 fully inserted into the system 100 after a release pushbutton 130 has been depressed by a user to cause a cam (not shown) of the spring-loaded actuator mechanism 110 to lift the Z-pluggable OCM 120 in the upward Y-direction off of the upper surface 103a of the motherboard PCB 103. The manner in which the spring-loaded actuator mechanism 110 operates will now be described with reference to FIGS. 6A-6E.

The spring-loaded actuator mechanism 110 includes the main spring 111, a base 112, a screw 113, a slider 114, a release trigger 116, a vertical support 117, a down trigger 118, and cams (not shown) that are housed within the guide system 140. A proximal end of the spring 111 is fixedly secured to the base 112. A proximal end of the screw 113 is also fixedly secured to the base 112. A shaft 113a of the screw 113 is slidable in the Z-directions through an opening formed in the slider 114. The release trigger 116 is rotationally coupled on its proximal end to the base 112. The release trigger 116 is in pivotal contact on its distal end to pins 121 disposed on opposite sides of vertical support 117 when the actuator mechanism 110 is in the rearward state, or position, shown in FIG. 6B. The down trigger 118 has a proximal end that is disposed in free space to come into contact with a head 113b of the screw 113 when the spring-loaded actuator 110 is in its rearward position shown in FIG. 6B. A distal end of the down trigger 118 is mechanically coupled to the release trigger 116.

When the Z-pluggable OCM 120 is inserted through the front panel 102 in the Z-direction into the interior of the box 101, the upper surface 131a of the housing 131 of the Z-pluggable OCM 120 engages the spring-loaded actuator mechanism 110, which is movable in the forward and reverse Z-directions within the guide system 140. The force exerted on the Z-pluggable OCM 120 in the forward Z-direction pushes the spring-loaded actuator 110 in the forward Z-direction until the spring-loaded actuator 110 is in its rearward position, as shown in FIG. 6B. As the spring-loaded actuator 110 travels in this direction, the distance between the base 112 and the slider 114 decreases, thereby causing the main spring 111 to become compressed. As the spring-loaded actuator mechanism 110 travels in this direction, the shaft 113a of the screw 113 slides through the opening formed in the slider 114 to extend in the direction indicated by arrow 145. When the spring-loaded actuator mechanism 110 arrives at its rearward position, the head 113b of the screw 113 comes into contact with the proximal end of the down trigger 118.

The down trigger 118 is essentially a lever such that the force applied by the head 113b of the screw 113 on the proximal end of the down trigger 116 causes the distal end of the down trigger 118 to move in the upward Y-direction. When the distal end of the down trigger 118 moves in this direction, the down trigger 118 triggers the release trigger 116 by disengaging the distal end of the release trigger 116 from the pins 121. When this happens, the energy stored in the main spring 111 is released, which forces the spring-loaded actuator mechanism 110 to move from its rearward position shown in FIG. 6B toward its forward position shown in FIG. 6D. As the spring-loaded actuator mechanism 110 moves from its rearward position shown in FIG. 6B to its forward position shown in FIG. 7D, the spring-loaded actuator mechanism 110 actuates a cam (not shown) of the guide mechanism 140 that pushes the Z-pluggable OCM 120 in the downward Y-direction to cause the electrically-conductive contacts (not shown) disposed on the lower surface of the PCB (not shown) of the OCM 120 to come into contact with the electrically-conductive contacts (not shown) disposed within the respective Megarray sockets 105.

With reference to FIG. 6E, the optical communications system 100 also includes a spring-loaded pushbutton mechanism comprising the release pushbutton 130 and a compression spring 135. A first portion 130a of the release pushbutton 130 extends through an opening 130c formed in the front panel 102. A second portion 130b of the pushbutton 130 extends behind the front panel 102. The compression spring 135 has a proximal end that is mechanically coupled with the second portion 130b of the pushbutton 130 and a distal end that abuts the spring-loaded actuator mechanism 110. When the Z-pluggable OCM 120 is in the in-and-down position shown in FIG. 6D, the pushbutton 130 is fully extended from the front panel 102. If the pushbutton 130 is pressed in the inward Z-direction until the first portion 130a of the pushbutton 130 is almost flush with the front panel 102, the distal end of the compression spring 135 will exert a force on the spring-loaded actuator mechanism 110 that will force it in the rearward Z-direction. When this happens, a cam (not shown) housed within the guide system 140 exerts a force on the Z-pluggable OCM 120 in the upward Y-direction that will cause the Z-pluggable OCM 120 to disengage from the motherboard PCB 103. The user can then extract the Z-pluggable OCM 120 from the system 100 by exerting a force on it in reverse Z-direction, i.e., away from the front panel 102.

The Z-pluggable OCM 120 includes an EMI shielding device 160 (FIGS. 6A-6E) that is similar or identical to the EMI shielding device 22 (FIGS. 3-5). The EMI shielding devices 22 are made of a metallic material such as, for example, sheet metal, which is solid and yet provides a degree of flexibility. As can be more clearly seen in FIG. 4, the portion 22a of the EMI shielding device 22 curves inwardly on all sides. When the Z-pluggable OCM 20 is in its fully-inserted position, the portion 22a is in abutment with the bezel 12a installed on the front panel 12. The flexibility of the EMI shielding device 22 allows portion 22a to deform slightly to ensure that it is in continuous contact with the metal bezel 12a. Once the Z-pluggable OCM 20 has been placed in its fully inserted position, the portion 22a remains in continuous contact with the bezel 12a even as the Z-pluggable OCM 20 is moved in the upward and downward Y-directions by the actuator mechanism 70.

The same is true for the EMI shielding device 160 shown in FIGS. 6A-6E. For example, it can be seen in FIGS. 6B-6D that the EMI shielding device 160 remains in abutment with the front panel 102 during the lowering and raising of the Z-pluggable OCM 120 in the downward and upward Y-directions. Both of the EMI shielding devices 22 and 160 provide robust EMI shielding solutions. It can also be seen in FIGS. 3 and 5 that the bezel 12a has walls 12a' on opposite sides of the bezel 12a that protrude from the bezel 12a in the rearward Z-direction. These walls 12a' are in abutment with the portions 22a of the respective EMI shielding devices 22 of the Z-pluggable OCMs 20 that are inserted into the system 10 adjacent to these walls 12a'. This feature further prevents air gaps from existing at the front panel 12, which ensures that very little, if any, EMI escapes from the box 11 through the front panel 12.

FIGS. 7A-7D illustrate another embodiment of an optical communications system 200 that is configured to receive a Z-pluggable OCM 210 and that includes an actuator mechanism (not shown) for imparting motion in the downward and upward Y-directions to the Z-pluggable OCM 210 to cause it to engage and disengage, respectively, a motherboard PCB 220 of the system 200. FIG. 7A illustrates a front perspective view of the optical communications system 200 just prior to the Z-pluggable OCM 210 being inserted through an opening 212a formed in a front panel 212 of the system 200. FIG. 7B illustrates a front perspective view of the optical communications system 200 after the Z-pluggable OCM 210 has been fully inserted into the system 200, but prior to the Z-pluggable OCM 210 being lowered by the actuator mechanism (not shown) to engage the motherboard PCB 220. FIG. 7C illustrates a front perspective view of the optical communications system 200 after the Z-pluggable OCM 210 has been fully inserted into the system 200 and after the Z-pluggable OCM 210 has been lowered by the actuator mechanism (not shown) to engage the motherboard PCB 220. FIG. 7D illustrates a front perspective view of the optical communications system 200 with the Z-pluggable OCM 210 in the fully inserted and engaged position shown in FIG. 7C with an optical connector module 230 connected to the Z-pluggable OCM 210.

Figure 8:
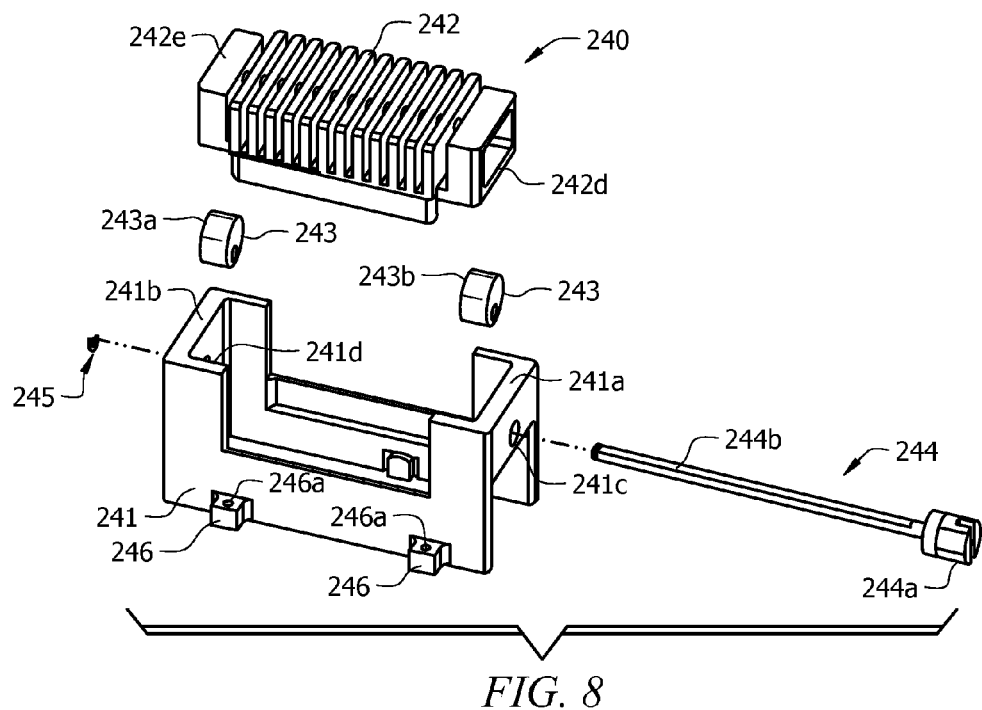
FIG. 8 illustrates one of the bays shown in FIGS. 7A-7D in its disassembled form to show the individual components of the bay.
Figures 9A, 9B:
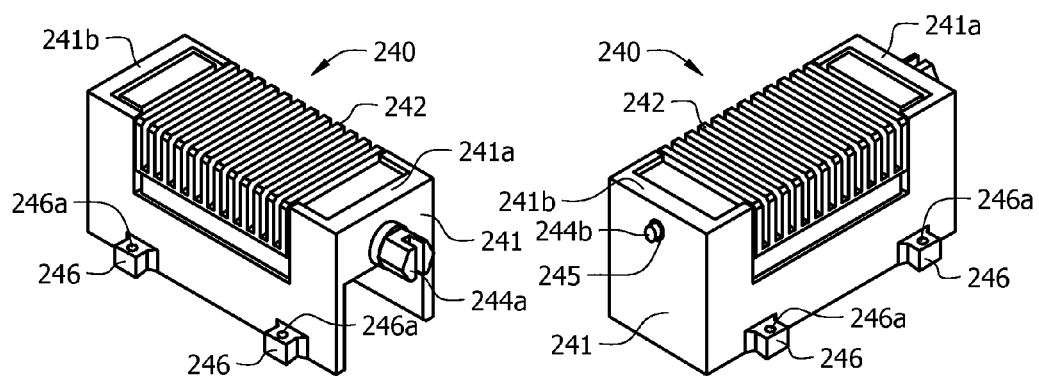
FIGS. 9A and 9B illustrate front and back perspective views, respectively, of the bay shown in FIG. 8 in its assembled form.
Figure 10A:
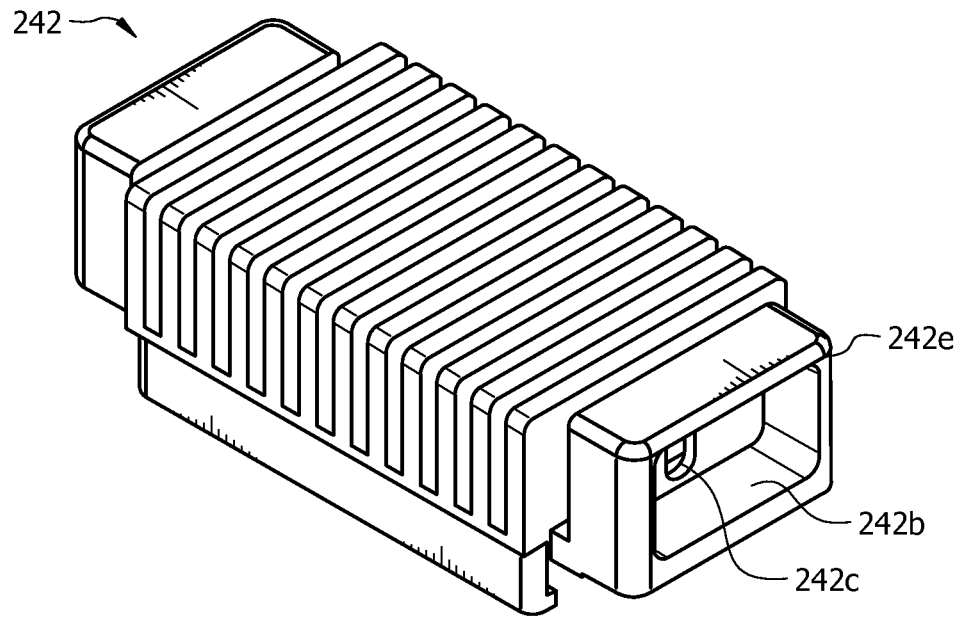
FIGS. 10A and 10B illustrate front and back perspective views, respectively, of the heat sink structure shown in FIG. 8.
Figure 10B:
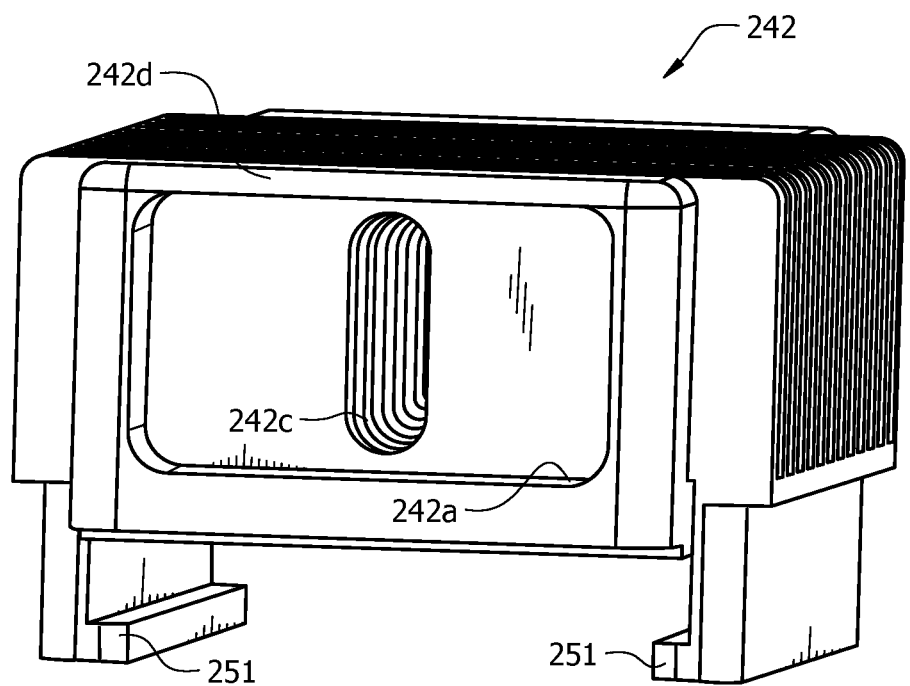
Figure 11:
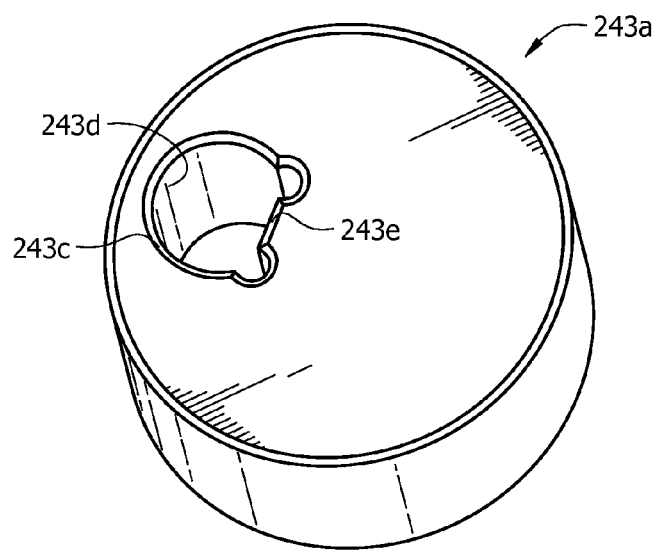
FIGS. 11 and 12 illustrate perspective views of the cam and the spindle, respectively, shown in FIG. 8.
Figure 12:
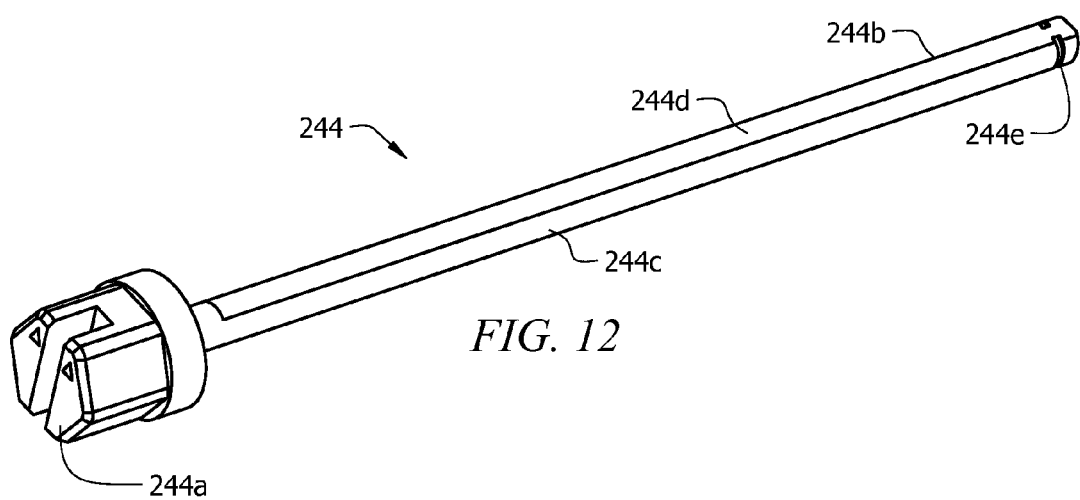

The embodiment of the optical communications system 200 shown in FIGS. 7A-7D has multiple bays 240 that are identically configured to receive respective Z-pluggable OCMs 210. The configurations of the bays 240 will be described with reference to FIGS. 8-12. FIG. 8 illustrates one of the bays 240 in its disassembled form to show the individual components of the bay 240. The bay 240 is made up of a frame 241, a heat sink structure 242, a cam 243, a spindle 244, and a retaining clip 245. FIGS. 9A and 9B illustrate front and back perspective views, respectively, of the bay 240 shown in FIG. 8 in its assembled form. FIGS. 10A and 10B illustrate front and back perspective views, respectively, of the heat sink structure 242 shown in FIG. 8. FIGS. 11 and 12 illustrate perspective views of the cam 243 and the spindle 244, respectively.

The manner in which the bay 240 is assembled will now be described with reference to FIG. 8-12. As shown in FIGS. 10A and 10B, first and second cams 243a and 243b are inserted into cam follower pockets 242a and 242b formed in opposite ends of the heat sink structure 242. A vertical slot 242c to allow movement of the spindle 244 extends from a front end 242d of the heat sink structure 242 to a back end 242e of the heat sink structure 242. As best seen in FIGS. 8-9B, after the cams 243a and 243b have been positioned within the cam follower pockets 242a and 242b, the heat sink structure 242 is inserted within the frame 241 such that the front end 242d of the heat sink structure 242 is adjacent an inner surface of a front wall 241a of the frame 241 and such that the back end 242e of the heat sink structure 242 is adjacent an inner surface of a back wall 241b of the frame 241.

After the heat sink structure 242 having the cams 243a and 243b positioned therein has been secured to the frame 241, a distal end of the spindle 244 is inserted through first and second thru holes 241c and 241d formed in the front and back walls 241a and 241b, respectively, of the frame 241 and through the offset holes 243c formed in the cams 243a and 243b (FIG. 11). The offset holes 243c each have a cylindrically-shaped inner surface portion 243d and a flat inner surface portion 243e that together form keyways in the cams 243a and 243b. The spindle 244 has a slotted, hexagonal head 244a and a shaft 244b. The shaft 244b has a cylindrically-shaped outer surface portion 244c and a flat outer surface portion 244d that together form a key. When the spindle 244 is inserted into the offset holes 243c formed in the cams 243a and 243b, the cylindrically-shaped inner surface portions 243d of the offset holes 243c are in contact with the cylindrically-shaped outer surface portion 244c of the shaft 244b, and the flat inner surface portions 243e of the offset holes 243c are in contact with the flat outer surface portion 244d of the shaft 244b. In this way, the spindle 244 couples with the cams 243a and 243b in a key/keyway coupling configuration.

When the bay 240 is in its assembled form shown in FIGS. 9A and 9B, the slotted, hexagonal head 244a of the spindle 244 is in abutment with an outer surface of the front wall 241a of the frame 241. The retaining clip 245 is then clipped into a retaining clip groove 244e shown in FIG. 12 such that the retaining clip 245 is in abutment with the outer surface of the back wall 241b of the frame 241, as shown in FIG. 9B. The frame 241 is secured to the upper surface of the motherboard PCB 220 via fastening devices (not shown) that are inserted through openings 246a formed in feet 246 of the frame 241.

The actuator mechanism, in accordance with this illustrative embodiment, is made up of portions of the frame 241, the heat sink structure 242, the cams 243a and 243b, the spindle 244, and the retaining clip 245. As shown in FIG. 10B, the heat sink structure 242 has rails 251 formed on opposite sides thereof that engage rails 211 (FIG. 7A) formed on opposite sides of the Z-pluggable OCM 210 when it is inserted into the opening 212a formed in the front panel 212 (FIG. 7B).

Once the Z-pluggable OCM 210 has been fully inserted into the bay 240, as shown in FIG. 7B, it is ready to be lowered onto the motherboard PCB 220. One or more Meg-array sockets 221 (FIGS. 7A and 7B) of the type shown in FIGS. 1 and 2 are mounted on the upper surface 220a of the motherboard PCB 220 within the bays 240. The lower surface of the PCB (not shown) of the Z-pluggable OCM 210 has one or more Meg-array connectors (not shown) thereon for mating with respective Meg-array sockets 221. To lower the Z-pluggable OCM 210 onto the motherboard PCB 220 and to raise the Z-pluggable OCM 210 onto the motherboard PCB 220, the user uses a screwdriver or the like to turn the head 244a of the spindle 244, as will now be described with reference to FIGS. 13A-13D.

Figure 13A:
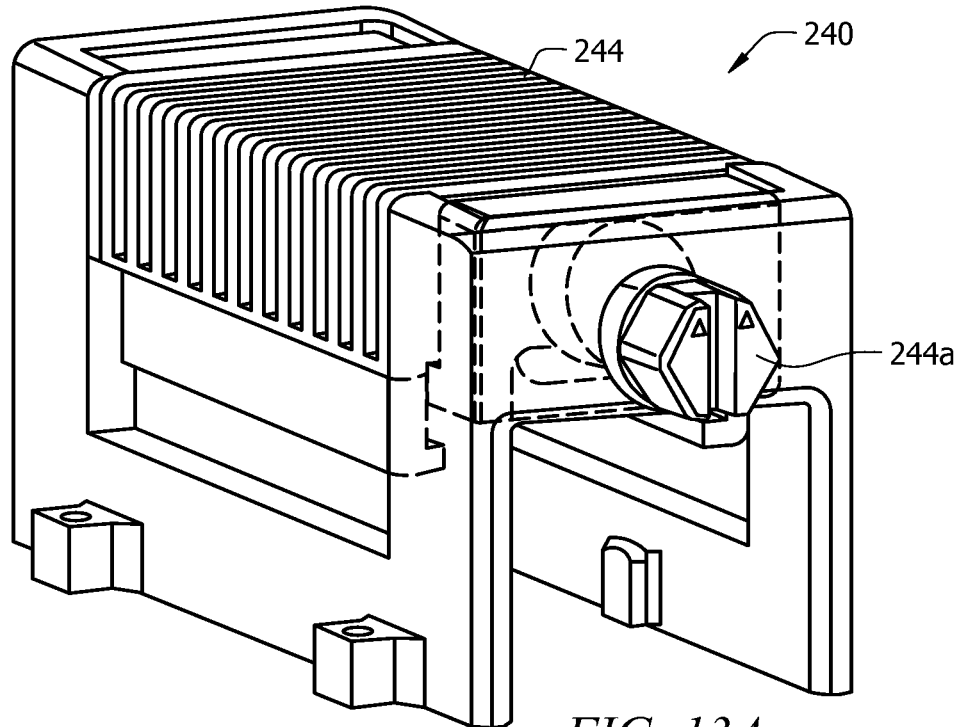
FIGS. 13A-13D illustrate front perspective views of one of the bays shown in FIGS. 7A-7D as the parallel OCM disposed in the bay is moved from its raised position to its lowered position by the actuator mechanism shown in FIGS. 8-12.
Figure 13B:
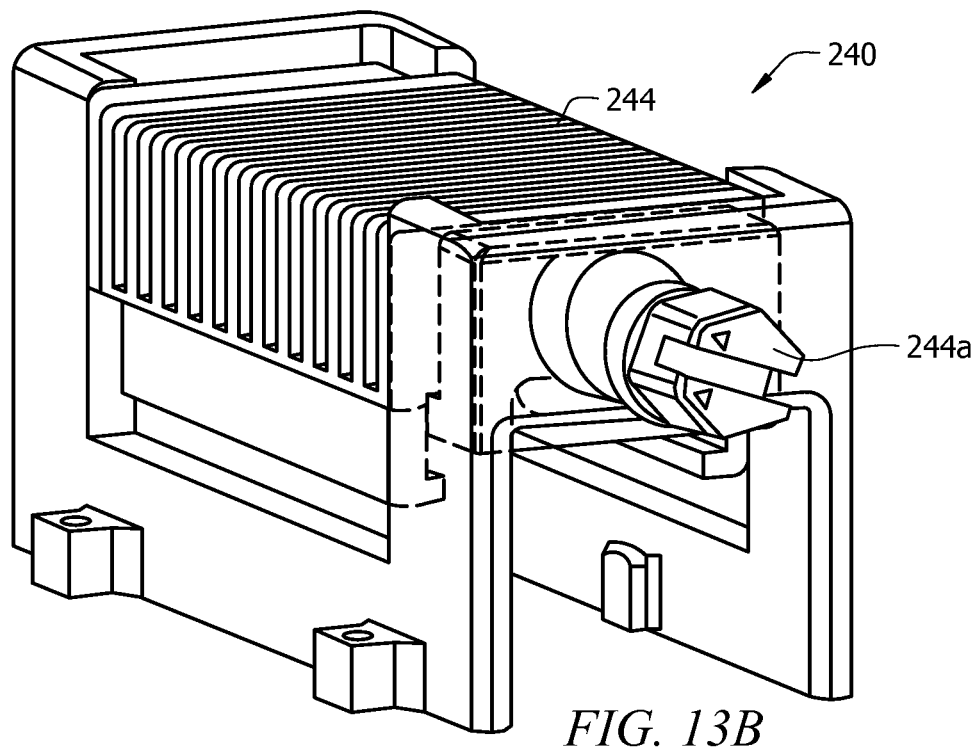
Figure 13C:
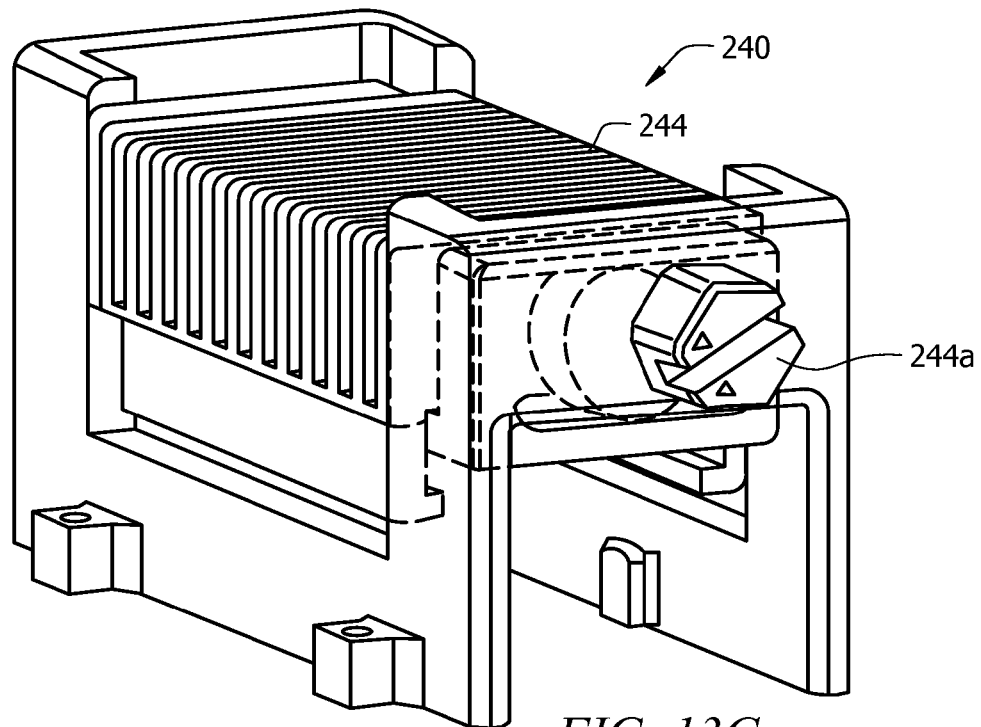
Figure 13D:
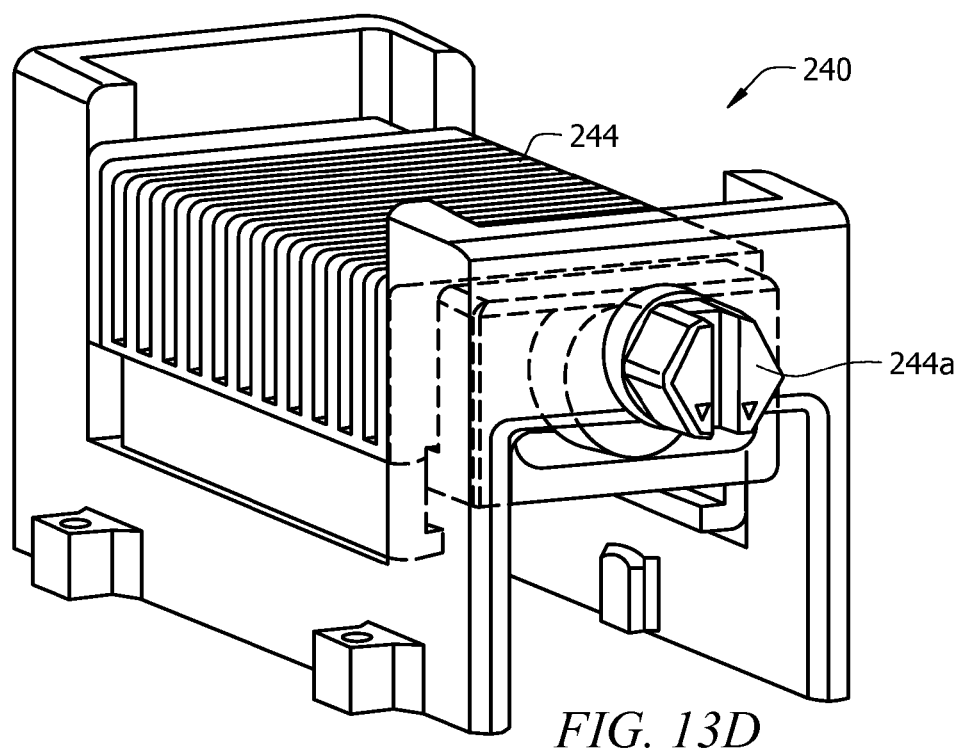

In FIG. 13A, the Z-pluggable OCB 210 is in its raised position. As the user turns the head 244a of the spindle 244 in the counterclockwise direction, the cams 243a and 243b move within the cam follower pocket 242a and 242b of the heat sink structure 242 from the position shown in FIG. 13A where they are applying an upwardly-directed force against the top of the pockets 242a and 242b to the position shown in FIGS. 13B-13D where they are applying a downwardly-directed force against the bottoms of the pockets 242a and 242b. In FIG. 13D, the Meg-array connectors (not shown) on the lower surface of the PCB of the OCM 210 are connected with the Meg-array sockets 221 disposed on the motherboard PCB 220. Turning the head 244a of the spindle 244 in the opposite direction will cause the OCM 210 to be raised in the Y-direction away from the motherboard PCB 220 to allow the OCM 210 to be removed from the system 200.

Figure 14:
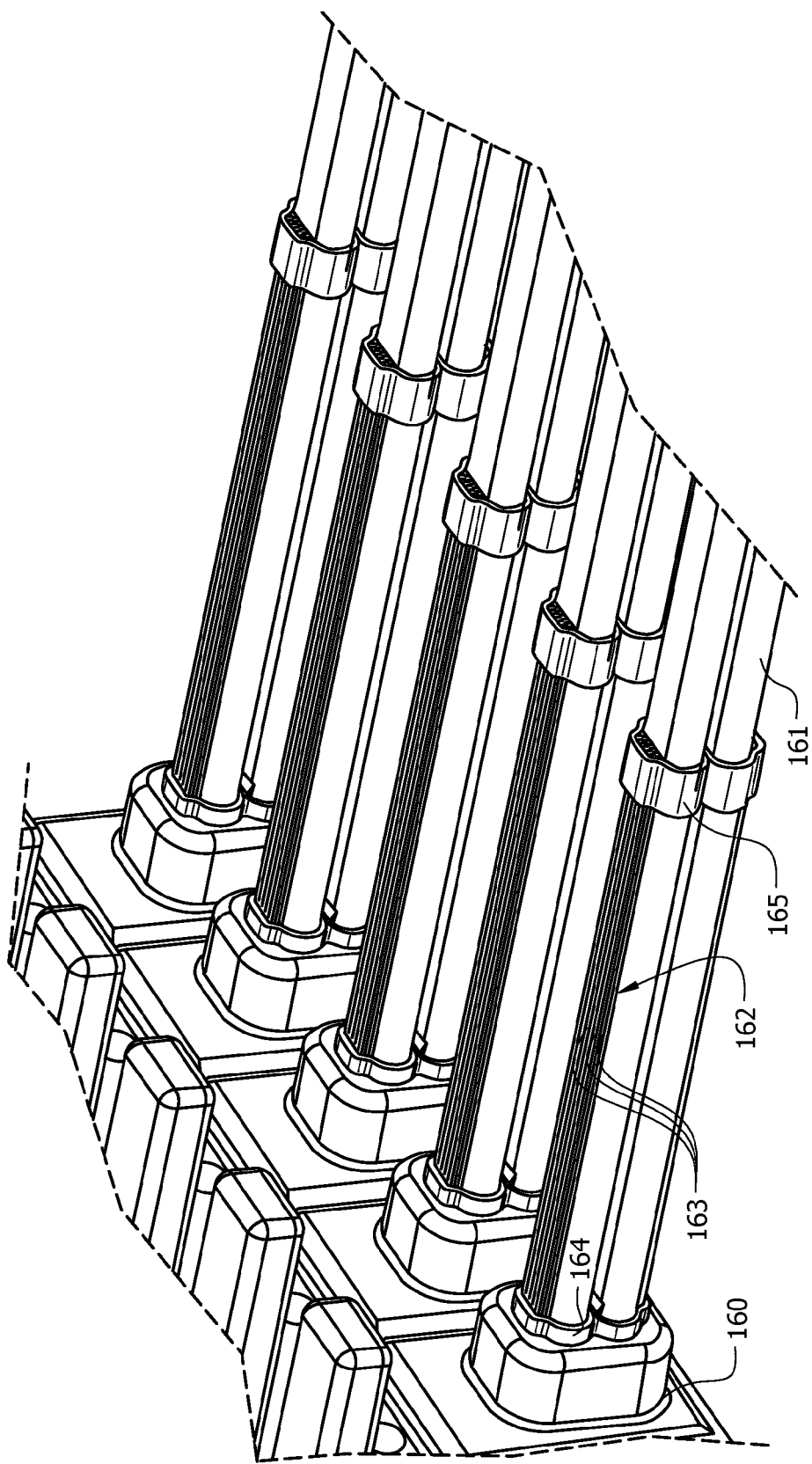
FIG. 14 illustrates a perspective view of the strain relief devices and the cables that are connected to the Z-pluggable OCMs shown in FIGS. 6A-6E.

FIG. 14 illustrates a perspective view of the strain relief devices and the cables 161 that are connected to the Z-pluggable OCMs 120 shown in FIGS. 6A-6E. Because the Z-pluggable OCMs 120 can be so densely mounted on the front panel 102, traditional strain relief components, such as rubber boots, may not provide sufficient bend resistance for the cables 161. In accordance with an illustrative embodiment, the strain relief devices include groups 162 of metal wires, or rods, 163 that are clamped between first and second clamps 164 and 165. The metal wires 163 may be, for example, 0.015 inches in diameter. The wire groups 162 are sufficiently strong to prevent the cables 161 from being bent beyond their minimum allowable bend radii. The strength of the wire groups 162 can also be easily tuned by using more or fewer wires 163 in each group 162.

The invention has been described with reference to a few illustrative, or exemplary, embodiments for the purpose of describing the principles and concepts of the invention. Those skilled in the art will understand that the invention is not limited to these illustrative embodiments. As will be understood by those skilled in the art in view of the description being provided herein, modifications may be made to the embodiments described herein while still achieving the goals of the invention, and all such modifications are within the scope of the invention.

What is claimed is:

1. A Z-pluggable optical communications module (OCM) comprising:
    a generally rectangular housing, the module housing being configured to be inserted through an opening formed in a front panel of a box in a Z-direction of an X, Y, Z Cartesian Coordinate system, wherein the box houses an optical communications system;
    a first printed circuit board (PCB) disposed within the housing;
    a plurality of parallel optical communications modules (POCMs) mounted on the first PCB, each POCM having a plurality of channels, each of the channels being either a transmit channel for transmitting optical data signals or a receive channel for receiving optical data signals;
    first ends of optical fibers of a plurality of groups of optical fibers of at least one optical fiber cable, the first ends of the optical fibers of each group being connected to a respective one of the POCMs, wherein the first ends are received into the housing through an opening formed in a first end of the housing; and
    a strain relief device, the strain relief device comprising a plurality of wires disposed on an upper surface of said at least one optical fiber cable with a first end of the plurality of wires coupled to said at least one optical fiber cable with a clamp and a second end of the plurality of wires coupled to the first end of the housing.

2. The Z-pluggable OCM of claim 1, wherein each POCM has at least twelve channels.

3. The Z-pluggable OCM of claim 2, wherein six of said at least twelve channels are transmit channels and wherein six of said at least twelve channels are receive channels.

4. The Z-pluggable OCM of claim 2, wherein the Z-pluggable OCM comprises at least four POCMs.

5. An optical communications system comprising:
    a system housing having at least a bottom panel and a front panel, the front panel having a plurality of openings formed therein, the front panel residing in an X-Y plane that is orthogonal to a forward Z-direction and to a reverse Z-direction;
    a motherboard printed circuit board (PCB) mounted on an upper surface of the bottom panel;
    a plurality of arrays of electrically-conductive contacts disposed on an upper surface of the motherboard PCB;
    a plurality of guide systems disposed within the system housing in alignment with respective ones of the openings formed in the front panel, the guide systems being configured to guide respective Z-pluggable optical communications modules (OCMs) in forward and reverse Z-directions relative to an X, Y, Z Cartesian coordinate system within an interior space of the box, the Z-directions being normal to a plane in which the front panel resides; and
    a plurality of actuator mechanisms disposed within the box and mechanically coupled to respective ones of the guide systems, each actuator mechanism comprising:
        a cam configured to be actuated to impart motion to a respective one of the Z-pluggable OCMs in a downward Y-direction and to be actuated to impart motion to a respective one of the Z-pluggable OCMs in an upward Y-direction, and a screw mechanically coupled to the cam and configured to actuate the cam.

6. The optical communications system of claim 5, further comprising:

a plurality of the Z-pluggable OCMs, each of the Z-pluggable OCMs being disposed within a respective one of the openings formed in the front panel of the system housing and being engaged with a respective one of the guide systems.

7. The optical communications system of claim 6, wherein each Z-pluggable OCM comprises:

a generally rectangular OCM housing;

an OCM PCB disposed within the OCM housing;

a plurality of parallel OCMs (POCMs) mounted on the OCM PCB, each POCM having a plurality of channels, each of the channels being either a transmit channel for transmitting optical data signals or a receive channel for receiving optical data signals;

a plurality of arrays of electrically-conductive contacts disposed on a lower surface of the OCM PCB for engaging respective ones of said plurality of arrays of electrically-conductive contacts disposed on the upper surface of the motherboard PCB when the respective actuator mechanism has lowered the respective Z-pluggable OCM in the downward Y-direction onto arrays of electrically-conductive contacts disposed on the upper surface of the motherboard PCB;

first ends of optical fibers of a plurality of groups of optical fibers of at least one optical fiber cable, the first ends of the optical fibers of each group being connected to a respective one of the POCMs, wherein the first ends are received into the OCM housing through an opening formed in a first end of the housing; and a strain relief device coupled to said at least one optical fiber cable and to the first end of the housing.

8. The optical communications system of claim 7, wherein the strain relief device comprises a plurality of wires disposed on an upper surface of said at least one optical fiber cable with a first end of the plurality of wires coupled to said at least one optical fiber cable with a clamp and a second end of the plurality of wires coupled to the first end of the housing.

9. The optical communications system of claim 5, wherein each actuator mechanism further comprises a main compression spring and one or more trigger mechanisms that are mechanically coupled to the screw and to the cam, and wherein movement of the guide system in the forward Z-direction compresses the spring and moves the screw in the Z-direction, and wherein triggering of said one or more trigger mechanisms allows the spring to decompress, and wherein when the spring decompresses, energy that was stored in the spring when it was compressed is transferred to the cam to cause the cam to impart motion to the respective Z-pluggable OCM in the downward Y-direction.

10. The optical communications system of claim 9, wherein each actuator mechanism further comprises a second compression spring and a pushbutton that are mechanically coupled to one another, the second compression spring being mechanically coupled to the cam, a portion of the pushbutton extending from the front panel, wherein when the respective Z-pluggable OCM is in the lowered position, depressing the pushbutton causes the second compression spring to become compressed such that the second compression spring exerts a force on the cam that causes the cam to impart motion to the respective Z-pluggable OCM in the upward Y-direction.

11. The optical communications system of claim 5, wherein the screw is mechanically coupled to the cam such that turning the screw in a first direction causes the cam configuration to impart motion to the respective Z-pluggable OCM in the downward Y-direction, and such that turning the screw in a second direction that is opposite to the first direction causes the cam configuration to impart motion to the respective Z-pluggable OCM in the upward Y-direction.

12. A method for edge-mounting Z-pluggable optical communications modules (OCMs) through a front panel of an optical communications system box, the method comprising:

providing a system housing having at least a bottom panel and a front panel, the front panel having a plurality of openings formed therein, the front panel residing in an X-Y plane of an X, Y, Z Cartesian Coordinate System, the X-Y plane being orthogonal to a forward Z-direction and to a reverse Z-direction, a motherboard printed circuit board (PCB) being mounted on an upper surface of the bottom panel, a plurality of arrays of electrically-conductive contacts being disposed on an upper surface of the motherboard PCB, a plurality of guide systems disposed within the system housing in alignment with respective ones of the openings formed in the front panel, the guide systems being configured to guide respective Z-pluggable optical communications modules (OCMs) in forward and reverse Z-directions relative to the X, Y, Z Cartesian coordinate system within an interior space of the box, the forward and reverse Z-directions being normal to the X-Y plane in which the front panel resides, a plurality of actuator mechanisms being disposed within the box and mechanically coupled to respective ones of the guide systems, each actuator mechanism comprising a cam configured to be actuated to impart motion to a respective one of the Z-pluggable OCMs in a downward Y-direction and to be actuated to impart motion to a respective one of the Z-pluggable OCMs in an upward Y-direction and a screw mechanically coupled to the cam and configured to actuate the cam;

providing at least one Z-pluggable OCM, the Z-pluggable OCM comprising a plurality of parallel OCMs (POCMs), a POCM PCB on which the POCMs are mounted, and an OCM housing in which the POCMs and the POCM PCB are housed;

fully inserting the Z-pluggable OCM within one of the openings formed in the front panel of the system housing such that the Z-pluggable OCM is fully engaged with one of the guide systems; and actuating the actuator mechanism to cause a force to be exerted on the Z-pluggable OCM in the downward Y-direction until a plurality of arrays of electrically-conductive contacts disposed on a lower surface of the OCM PCB engage respective ones of said plurality of arrays of electrically-conductive contacts disposed on the upper surface of the motherboard PCB.

13. The method of claim 12, wherein each POCM has a plurality of channels, each of the channels being either a transmit channel for transmitting optical data signals or a receive channel for receiving optical data signals, and wherein the Z-pluggable OCM further comprises:

first ends of optical fibers of a plurality of groups of optical fibers of at least one optical fiber cable, the first ends of the optical fibers of each group being connected to a respective one of the POCMs, wherein the first ends are received into the OCM housing through an opening formed in a first end of the housing; and a strain relief device coupled to said at least one optical fiber cable and to the first end of the OCM housing.

14. The method of claim 12, wherein each POCM has at least twelve channels.

15. The method of claim 14, wherein six of said at least twelve channels are transmit channels and wherein six of said at least twelve channels are receive channels.

16. The method of claim 14, wherein the Z-pluggable OCM comprises at least four POCMs.

17. The method of claim 13, wherein the strain relief device comprises a plurality of wires disposed on an upper surface of said at least one optical fiber cable with a first end of the plurality of wires coupled to said at least one optical fiber cable with a clamp and a second end of the plurality of wires coupled to the first end of the housing.

18. The method of claim 12, wherein each actuator mechanism further comprises a main compression spring and one or more trigger mechanisms that are mechanically coupled to the screw and to the cam, and wherein movement of the guide system in the forward Z-direction compresses the spring and moves the screw in the Z-direction, and wherein triggering of said one or more trigger mechanisms allows the spring to decompress, and wherein when the spring decompresses, energy that was stored in the spring when it was compressed is transferred to the cam to cause the cam to impart motion to the respective Z-pluggable OCM in the downward Y-direction.

19. The method of claim 18, wherein each actuator mechanism further comprises a second compression spring and a pushbutton that are mechanically coupled to one another, the second compression spring being mechanically coupled to the cam, a portion of the pushbutton extending from the front panel, wherein when the respective Z-pluggable OCM is in the lowered position, depressing the pushbutton causes the second compression spring to become compressed such that the second compression spring exerts a force on the cam that causes cam to impart motion to the respective Z-pluggable OCM in the upward Y-direction.

20. The method of claim 12, wherein the screw is mechanically coupled to the cam such that turning the screw in a first direction causes the cam to impart motion to the respective Z-pluggable OCM in the downward Y-direction, and such that turning the screw in a second direction that is opposite to the first direction causes the cam to impart motion to the respective Z-pluggable OCM in the upward Y-direction.

* * * * *